United States Patent

[11] 3,581,194

[72] Inventor Ruben Tegholm
     Johanneshov, Sweden
[21] Appl. No. 796,399
[22] Filed Feb. 4, 1969
[45] Patented May 25, 1971
[73] Assignee Atlas Copco Aktiebolog
     Nacka, Sweden
[32] Priority Feb. 6, 1968
[33] Sweden
[31] 1568/68

[54] TEMPERATURE RESPONSIVE MEANS FOR AUTOMATICALLY CORRECTING VARIATIONS IN THE COMPENSATION OF AN ELECTROMAGNETIC PROSPECTING DEVICE
6 Claims, 2 Drawing Figs.

[52] U.S. Cl. .................................................. 324/6,
                                                        324/4
[51] Int. Cl. .................................................. G01v 3/12,
                                                        G01v 3/16

[50] Field of Search ............................................ 324/3, 4, 6,
                                                               8, 10

[56]                References Cited
                UNITED STATES PATENTS
3,051,892   8/1962   Huston ........................ 324/6
3,108,220   10/1963  Ruddock ..................... 324/6

Primary Examiner—Gerard R. Strecker
Attorney—Eric Y. Munson

ABSTRACT: In an electromagnetic prospecting device having both a transmitter coil and a receiver coil mounted on the same frame, an auxiliary transmitter coil is provided on the frame intermediate the transmitter and receiver coils for compensation of the influence of the primary field, generated by the transmitter, on the receiver, there also being means for automatically correcting variations in the compensation due to changes in the distance between the transmitter and receiver coils caused by fluctuations in temperature and forces to which the device is exposed.

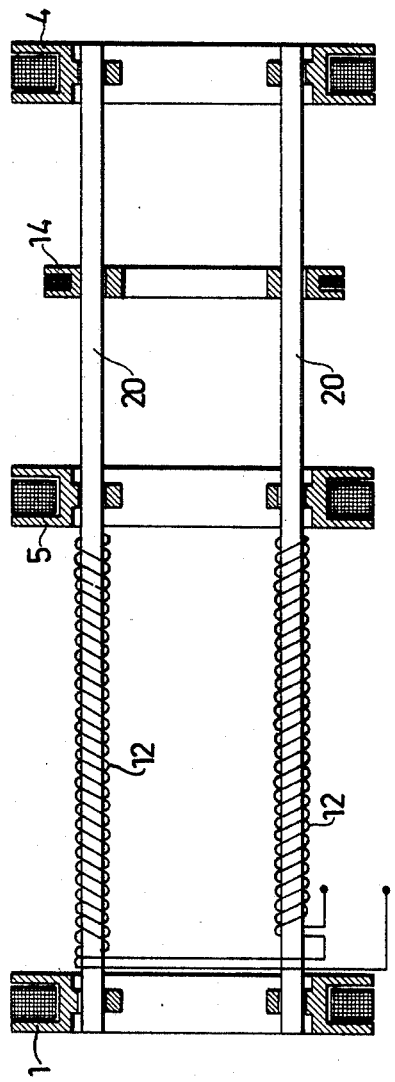
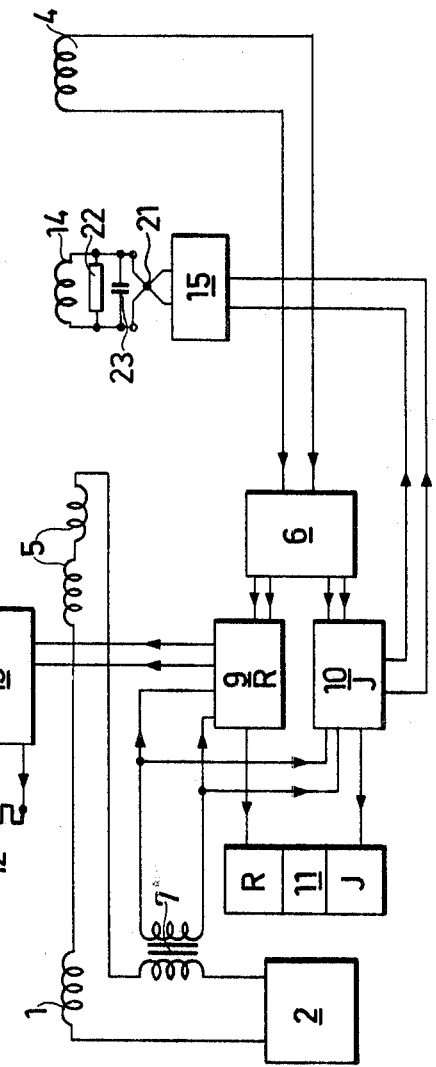

TEMPERATURE RESPONSIVE MEANS FOR AUTOMATICALLY CORRECTING VARIATIONS IN THE COMPENSATION OF AN ELECTROMAGNETIC PROSPECTING DEVICE

The present invention relates to a device for electromagnetic prospecting, and, in particular, electromagnetic prospecting by aid of an apparatus, in which a transmitter of electromagnetic waves and a receiver of such waves, arranged at a comparatively short distance from the transmitter, say, 5—10 m. for instance, are supported by a common rigid support structure which is carried, when prospecting, by aircraft, a helicopter for instance, towed at a distance from the craft to avoid severe interference between the waves to be measured and field components caused by metal masses present in the aircraft.

More particularly, the invention relates to a device for electromagnetic prospecting which measures very small anomalies in an electromagnetic field received by the air born receiver during motion of the device above a ground region to be explored and originating from the transmitter, said field varying with the electromagnetic properties of the ground above which the transmitter and the receiver are moved as a unit.

In this type of electromagnetic prospecting, an electromagnetic field is transmitted from an airborn transmitter either in the form of continuous waves of low frequency, usually in the order of size 10 Hz.—100,000 Hz., or as short intermittent pulses. Influenced by this field, called a primary field, secondary fields are generated in an ore body passed over by the craft, the magnitude of said secondary field being representative of the conductance of the ore body and actuating a receiver antenna coil of air born receiver. The secondary field at the receiver is measured in phase as well as amplitude while comparing it with a reference signal emitted by the transmitter.

Heretofore, it has been common practice, to measure the secondary field in a comparatively weak primary field and to obtain a sufficiently strong secondary field as compared with the primary field at the receiver, carrying out the measurements by maintaining a substantial distance between the transmitter and the receiver of, say, 50—200 m. The weakest anomalies which could be measured with such an arrangement between the transmitter and the receiver, are about 0.5 percent of the magnitude of the primary field as present at the receiver, the limitation to this comparatively high figure being mainly due to difficulty in maintaining a constant mutual orientation of the transmitter and the receiver when moved together at such large distances from each other.

To avoid such difficulties and to obtain more accurate results, an apparatus has been devised, in which the transmitter and the receiver are arranged at a considerably smaller distance from each other, namely in the range of 5—10 m., the transmitter and the receiver being arranged at such distance from each other on a common rigid support structure.

With such an apparatus, the secondary field representing anomalies is extremely small, namely in the order of as low as $1:10^5$ of the primary field. Due to the fact that the primary intensity decreases with increase in distance at the rate of the third power of the distance, it is imperative that the distance between the transmitter and the receiver during measurement is maintained very constant, namely within about $1:10^6$ of the distance, to obtain a measurement representative of the characteristic features of the anomalies corresponding to the properties of the ambient region. Thus, when the distance between the transmitter and the receiver is, for instance, 10 meters the effective distance between the transmitter antenna coil and the receiver antenna coil should not vary more than 0.01 mm. during a measurement, other constructional specification remaining unchanged. Corresponding limitations are also present with respect to changes of other dimensions of the transmitter and receiver coil arrangement of the apparatus, such as the diameters of said transmitter and receiver antenna coils.

To make possible a measurement of secondary fields with such extremely high accuracy, the electromagnetic prospecting apparatus comprises a transmitter and a receiver mounted on a common rigid support structure which has been equipped with compensation coils. Known apparatus of this type has suffered from the deficiency that they are all extremely sensitive to changes in temperature of the apparatus, such changes in practice being unavoidable.

A principal object of the present invention is to provide a device comprising a transmitter antenna coil system, a receiver antenna coil system, both mounted on a common rigid support structure and an improved means for compensation of the influence of the primary field on the receiver.

A major object of the invention is to provide, in the above described device, means for automatically correcting variations in said compensation arising while using the device, by which the signal caused by an anomaly is substantially independent of changes in shape, in particular, of the device due to changes of forces to which the device is exposed and variations of temperature, which may occur during use of the device.

The invention will be further illustrated by the following description in connection with the accompanying drawings schematically showing an example of an embodiment thereof.

IN THE DRAWINGS

FIG. 1 schematically illustrates an embodiment of a device according to the invention, comprising a transmitter antenna coil system, a receiver antenna coil system and a field correction coil system, all mounted on a common, rigid support structure, and FIG. 2 shows a block diagram representing electrical circuits of a device arranged according to FIG. 1.

The device as illustrated comprises a transmitter having a main antenna coil and an auxiliary antenna coil located at a distance from the main antenna coil in the direction towards a receiver antenna coil, the field generated by the auxiliary antenna coil compensating, at the receiver coil, for the field generated by the main antenna coil. However, the invention is adaptable also with a prospecting apparatus in which the compensation in the receiver of signals originating from the primary field of the transmitter antenna coil is by other means than an auxiliary transmitter antenna coil arranged as described below.

Thus, the transmitter antenna coil system comprises a transmitter main coil 1 and a transmitter auxiliary coil 5, the last mentioned coil being connected in series with the transmitter main coil 1 and located between said coil 1 and a receiver coil 4, the transmitter auxiliary coil 5 being so arranged and dimensioned that any influence on the receiver coil 4 by the primary field generated by the transmitter main coil 1 is compensated for. The transmitter auxiliary coil 5 being arranged much closer to the receiver coil 4 than is the transmitter main coil 1, the field of which is to be compensated at the receiver coil, the dimensioning of the auxiliary coil 5 can be so selected, and the coil so arranged, that the field generated thereby does not substantially diminish the effective field of the main coil 1 in the range at which measurements are to be taken.

Due to the fact that the field strength at the receiver antenna coil the respective transmitter antenna coils decreases with increasing distance at the rate of the third power of the distance between the coils, it is very important that the mutual distances between the coils are accurately selected to provide satisfactory compensation.

FIG. 2 illustrates a block diagram of an embodiment of a transmitter-receiver-circuit, of which the coils shown in FIG. 1, namely the transmitter main coil 1 the compensating transmitter auxiliary coil 5, and the receiver coil 4, constitute a part thereof. The transmitter main coil 1 and auxiliary coil 5 are mutually connected in series and are fed by a current having a frequency selected as usual with respect to the measurement to be effected, said current being generated by an oscillator 2.

Receiver coil 4 is connected to the input circuit of an amplifier 6 having two output circuits, said output circuits being connected to the input circuit of each of the phase discriminators 9 and 10, respectively. Discriminator 9 provides a representation of the inphase component of a signal voltage originating from the receiver coil and amplified by amplifier 6, and discriminator 10 a representation of the quadrature component of the same signal voltage. To accomplish this, a reference voltage derived from the secondary of a transformer 7, the primary of which constitutes part of the oscillator 2 circuit, is applied to each one of the discriminators 9 and 10. Any other well-known means may be used to obtain a reference voltage also.

Signal output circuits of discriminators 9 and 10 are connected to recording means R and J, respectively, of a recording instrument 11, the record of which is evaluated in the usual manner.

Even when the coils 1, 5, and 4 are maintained in fixed positions relatively to each other, and carried by a common strong support structure, in practice it has been found the antenna arrangement is exposed to such temperature variations causing changes in the relative positions of the coils such that the important and very sensitive compensation of the primary field at the receiver coil is adversely effected. As mentioned above, it is a question of changes in position of the order of hundredths of a millimeter.

It is disadvantages of this kind, which have proved to be present with devices of the kind heretofore known, and which are avoided by use of the present invention.

The support structure carrying the transmitter antenna system and the receiver antenna system, in the example illustrated in FIG. 1, comprising bars 20, is equipped with heating means fed by electrical current, the heating means being illustrated as bifilarly wound resistance wires 12. Said heating means is connected to a controllable current source 13 (FIG. 2) which controls the magnitude of the electrical load delivered to the heating means depending on the signal received by the receiver antenna coil 4. The arrangement is such that with a change of dimension of the support structure, the bars 20, caused by increasing the heat supply to the support structure there is a decrease in the signal generated by the receiver coil 4. Obviously, the characteristics of the device are selected and a certain minimum current is present in the heating means to maintain this whereby a desired compensation is present.

In the device illustrated in the drawing the controlled increase and decrease of the current dependent on the signal received by the receiver coil 4, is not only dependent on the amplitude of the received signal, as compared with the transmitter current, but on the phase of the signal as well. To this end, the current source, the power amplifier 13, receives a control signal from discriminator 9, the magnitude thereof being controlled depending on the amplitude and phase of the signal received from the receiver coil.

The output from the discriminator 9 which is transmitted to both the recorder 11R and the amplifier 13 includes both the anomaly signal and the unbalanced signal, if any. The anomaly signal is only transient and of very short duration as compared to the temperature-time constant of the heating means 12 and the amplifier 13, and therefore has an insignificant influence on control of the thermal expansion of the bars 20.

With this arrangement an unbalanced voltage originating from the receiver coil is thus applied to the recording instrument 11 and recorded thereby, as well as to the amplifier 13 as control voltage thereof, thus providing an increase or a decrease of the current through the support structure heating means 12. Due to increase or decrease, respectively, of the dimension of the support structure, the distance between the coils increases or decreases, respectively, whereby a decrease of the unbalance voltage results.

Control of the device as described tends towards the smallest possible signal in the receiver coil 4 when the device is in use. The time constant for the control of the dimensional properties of the device, however, due to very large heat masses as compared to the duration of a normal anomaly originating from an ore body results in anomalies being recorded by the recording instrument 11 without significant distortion in practice.

It is easily understood that the automatic correction obtained with a device according to the invention by the compensation of the field present at the receiver coil, allows for a very simple first adjustment of the coil arrangement, this being due to the fact that the distance between the coils is so selected, that, within a predetermined margin, the control necessary during the use of the device will fall within the control range of the automatic correction.

With the device as so far described, a compensation is obtained mainly for the inphase component of the signal generated by the receiver coil 4. A compensation for a quadrature component can as well be provided for, namely by aid of a further coil 14, a load coil, located between the transmitter coils 1 and 5 and the receiver coil 4, said load coil comprising a relatively few number of turns and being loaded by a temperature dependent resistance, a thermistor 21, which a controlled by means of a power amplifier 15, this amplifier being controlled by a control voltage derived from phase discriminator 10 for the quadrature component of the unbalanced voltage. In addition to the thermistor 21, the load coil 14 is loaded by a resistance 22 and a capacitor 23.

By proper dimensioning of the circuit loading coil 14, said coil generates a secondary field providing a correction of the unbalance of said quadrature component. In this case as well, a heat inertia, namely the inertia of the thermistor 21, provides the desired recording of rapid changes of the field originating from ore bodies, while slow changes in the quadrature component of the field are continuously compensated.

It is obvious that various modifications are possible in the device according to the invention described by way of example and that the design details of a device according to the invention can vary considerably within the scope of the invention.

I claim:

1. A device for electromagnetic prospecting comprising a transmitter including a transmitter antenna coil system for transmitting a primary electromagnetic field, and a receiver including a receiver antenna coil system for receiving a secondary electromagnetic field generated by influence of a primary field originating from said transmitter antenna coil system in a conductive medium remote from the device, and auxiliary means for generating a compensation signal to effect a compensation in the receiver for the direct influence said primary electromagnetic field has on the receiver antenna coil system, said transmitter antenna coil system and said receiver antenna coil system being attached to a common rigid support structure at a distance from each other, said device further comprising temperature sensitive means for varying said compensation signal in response to variations in the temperature, electric heating means controlled by a current source coupled to said temperature sensitive means to transfer heat thereto and means for regulating the electric current delivered to said electric heating means by said current source in response to an output signal of said receiver.

2. A device according to claim 1, in which said temperature sensitive means includes a portion of said common support structure located between a coil of said transmitter antenna coil system and a coil of said receiver antenna coil system, the material of said support structure being sensitive to temperatures resulting in changes in the dimensions of said support structure.

3. A device according to claim 2, in which said heating means includes a resistive conductor, wound bifilarly about at least portion of said support structure located between a coil of said transmitter antenna coil system and a coil of said receiver antenna coil system.

4. A device according to claim 1, in which said temperature sensitive means includes a temperature responsive resistance means, said resistance means being incorporated in said heating means to regulate the electric current supplied to the heating means and arranged as a resistive load of a circuit comprising an inductance and a capacitance, said inductance being located to effect an influence on the magnetic field present at said receiver antenna coil system in response to current passing said inductance.

5. A device according to claim 2, comprising a discriminator to compare a signal applied to said transmitter antenna coil system and a signal delivered by said receiver and to deliver a signal in response to the magnitude of the inphase component of said receiver signal as derived from said discriminator, and a signal controlled current supply source having a control magnitude input circuit connected to an output circuit of said discriminator and an output circuit connected to said heating means to supply energy thereto in response to a control signal applied to said control magnitude input circuit.

6. A device according to claim 4, comprising a discriminator to compare a signal applied to said transmitter antenna coil system and a signal delivered by said receiver and to deliver a signal in response to the magnitude of the quadrature component of said receiver signal as derived from said discriminator, and a signal controlled current supply source having a control magnitude input circuit connected to an output circuit of said discriminator and an output circuit connected to said heating means to supply energy thereto in response to a control signal applied to said control magnitude input circuit.